US006997486B2

United States Patent
Milhas

(10) Patent No.: US 6,997,486 B2
(45) Date of Patent: Feb. 14, 2006

(54) LOW-PERMEABILITY CONNECTING DEVICE

(75) Inventor: Pierre Milhas, Vitry le Francois (FR)

(73) Assignee: Nobel Plastiques, (FR)

( * ) Notice: Subject to any disclaimer, the term of this patent is extended or adjusted under 35 U.S.C. 154(b) by 81 days.

(21) Appl. No.: 10/148,637

(22) PCT Filed: Dec. 6, 2000

(86) PCT No.: PCT/FR00/03401

§ 371 (c)(1),
(2), (4) Date: Jun. 4, 2002

(87) PCT Pub. No.: WO01/44709

PCT Pub. Date: Jun. 21, 2001

(65) Prior Publication Data

US 2002/0182005 A1 Dec. 5, 2002

(30) Foreign Application Priority Data

Dec. 13, 1999 (FR) .................................. 99 15656

(51) Int. Cl.
*F16L 37/00* (2006.01)
*F16L 35/00* (2006.01)
(52) U.S. Cl. ...................... 285/305; 285/321; 285/331; 285/351
(58) Field of Classification Search ................. 285/305, 285/319, 321, 81, 82, 87, 331, 351
See application file for complete search history.

(56) References Cited

U.S. PATENT DOCUMENTS

| 2,772,898 A | * | 12/1956 | Seeler ......................... 285/190 |
| 4,007,953 A | * | 2/1977 | Powell ........................ 285/321 |
| 4,423,891 A | * | 1/1984 | Menges ....................... 285/305 |
| 4,700,926 A | * | 10/1987 | Hansen ..................... 251/149.8 |
| 4,867,487 A | * | 9/1989 | Phillis ......................... 285/305 |
| 4,991,882 A | * | 2/1991 | Gahwiler ..................... 285/331 |
| 5,468,028 A | | 11/1995 | Olson |
| 5,609,370 A | * | 3/1997 | Szabo et al. ................. 285/319 |
| 6,186,558 B1 | * | 2/2001 | Komolrochanaporn . 285/148.19 |
| 6,517,120 B1 | * | 2/2003 | Miyajima et al. ........... 285/305 |

FOREIGN PATENT DOCUMENTS

| DE | 41 39 825 C1 | 12/1992 |
| FR | 0 480 818 A1 | 4/1992 |

* cited by examiner

*Primary Examiner*—James M. Hewitt
(74) *Attorney, Agent, or Firm*—Dykema Gossett PLLC

(57) ABSTRACT

A low permeability coupling device for coupling a first endpiece (3) extending a tube (2) with a second endpiece (10) carried by the wall (1) of a member to which the tube (2) is connected, in which the second endpiece (10) has two substantially coaxial walls (11, 12) defining between them a blind annular housing (13) for receiving the first endpiece (3), and a sealing element (15) extending between the inside face (11a) of the outer wall (11) of the second endpiece and the outside surface (8) of the first endpiece when it is in place in the above-mentioned housing (13).

6 Claims, 2 Drawing Sheets

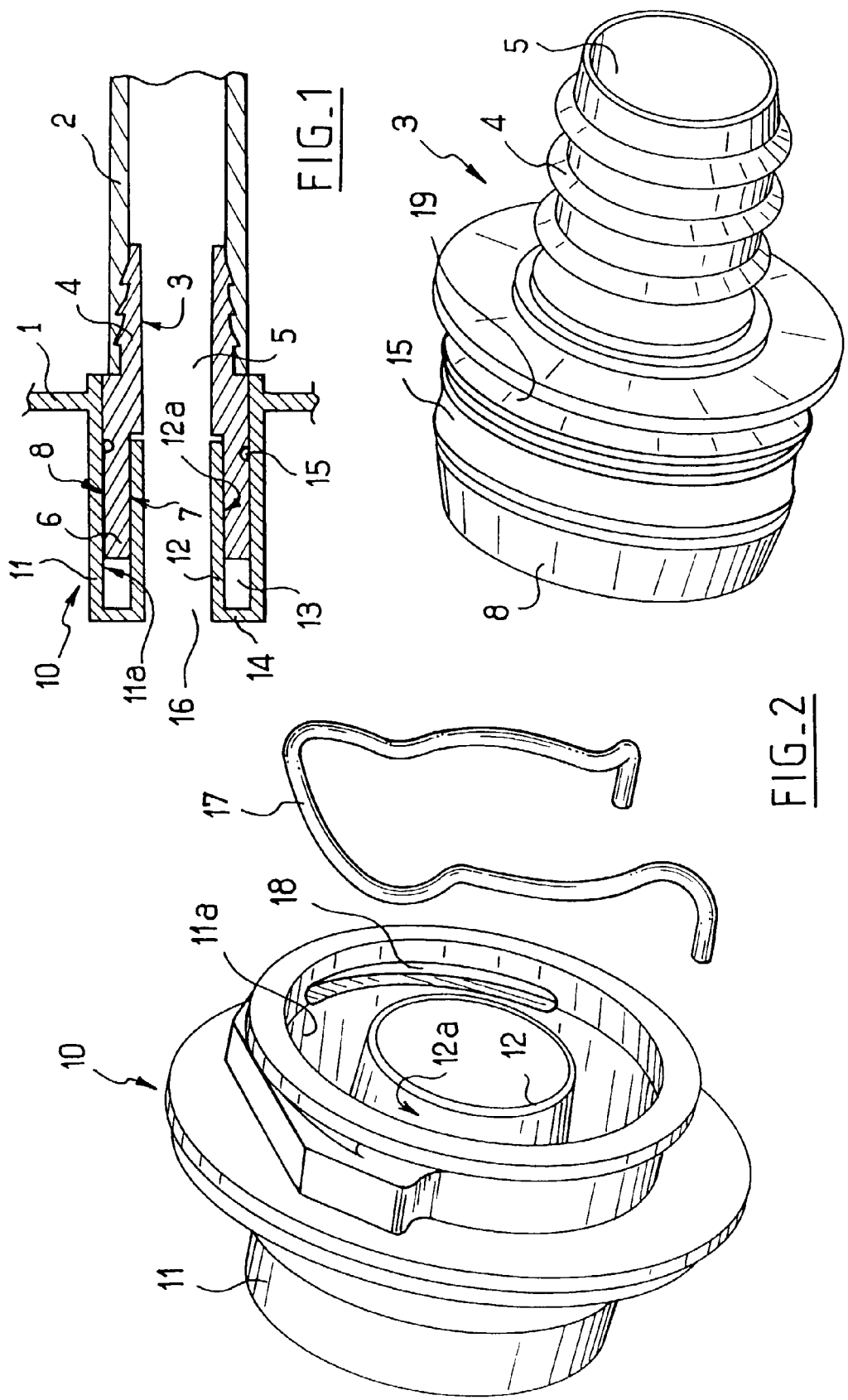

LOW-PERMEABILITY CONNECTING DEVICE

This application is the national phase under 35 U.S.C. § 371 of PCT International Application No. PCT/FR00/03401 which has an International filing date of Dec. 6, 2000, which designated the United States of America.

The present invention relates to a coupling device, in particular a quick coupling provided with means for ensuring that escapes into the atmosphere of substances or certain ingredients thereof flowing through the coupling are kept to within limits that are acceptable given the present or forthcoming standards and regulations that are in force in the field of motor vehicles.

BACKGROUND OF THE DISCLOSURE

In motor vehicle engines, fluids (fuel, cooling liquid, air conditioning liquid, hydraulic liquid for power assistance, windscreen washing liquid, . . . ) are transported by pipes to and from pumps and tanks via ducts made of synthetic material that are connected to functional members by means of a variety of connection devices.

The present trend for making such connections is to make use of so-called "quick" couplings which comprise rigid endpieces of complementary shapes, one secured to the duct and the other secured to the functional member, with one being engaged in the other and both behind held together by some kind of automatic latch.

There is necessarily a degree of functional clearance between these endpieces in order to enable them to be connected and disconnected easily, and in particular without using tools, and this clearance needs to be sealed in order to avoid leakage.

The sealing members used are quite effective with respect to the liquids that are transported, but these liquids contain multiple components, some of which are highly volatile and get round the seals that are put into place. The fluid circuit at this location is therefore more permeable than it is elsewhere, and it is in such coupling zones that high rates of emission to the atmosphere are observed, which emission can make the entire circuit unsuitable for complying with the prescribed standards or recommendations.

OBJECTS AND SUMMARY OF THE INVENTION

The present invention seeks to remedy this drawback by fitting coupling devices with means for controlling emissions of pollutants (in particular hydrocarbons) via couplings.

To this end, the invention provides a low permeability coupling device for coupling a first endpiece extending a tube with a second endpiece carried by the wall of a member to which the tube is connected, in which the second endpiece has two substantially coaxial walls defining between them a blind annular housing for receiving the first endpiece, a sealing element extending between the inside face of the outer wall of the second endpiece and the outside surface of the first endpiece, and the inside surface of the first endpiece being in contact with the outside face of the inner wall of the second endpiece when said first endpiece is placed in the above-mentioned housing.

Naturally, it is assumed that the inside wall of the second endpiece co-operates in relatively leaktight manner with the inside face of the wall of the second endpiece, as in any coupling, with this being achieved by using a gasket or otherwise. The disposition of the invention is such that the housing which receives the first endpiece between the two walls of the second endpiece constitutes a chamber for confining emissions of substances that pass through the first seal. In this chamber, the substances tending to escape are in the form of vapor and can condense. Their pressure is well below the pressure that exists in the duct passing through the two endpieces, so these substances have much less tendency to escape towards the outside than they do to pass through the first seal. This tendency can then be countered by gaskets which are much more effective than those implemented in known coupling devices or couplers.

In a preferred embodiment, provision can be made for the blind end of the annular housing to be situated completely on one side of the wall of the member which carries the second endpiece, and preferably beside its inside face so that if the wall of this housing is permeable (because it is made of a synthetic material and all synthetic materials are permeable to hydrocarbons or to alcohol-containing substances in motor vehicle fluids), then the substances passing through this wall will return to the inside space of the functional member whether it is constituted by a fuel tank, a fuel pump, . . . This implements a kind of recycling for substance that would otherwise tend to escape to the atmosphere.

BRIEF DESCRIPTION OF THE DRAWINGS

Other characteristics and advantages of the invention appear from the description given below by way of example and with reference to the accompanying drawings, in which:

FIG. 1 is a longitudinal section diagram showing the principle of the invention;

FIG. 2 is an exploded perspective view showing an embodiment of a coupling device of the invention.

MORE DETAILED DESCRIPTION

Figure 3:
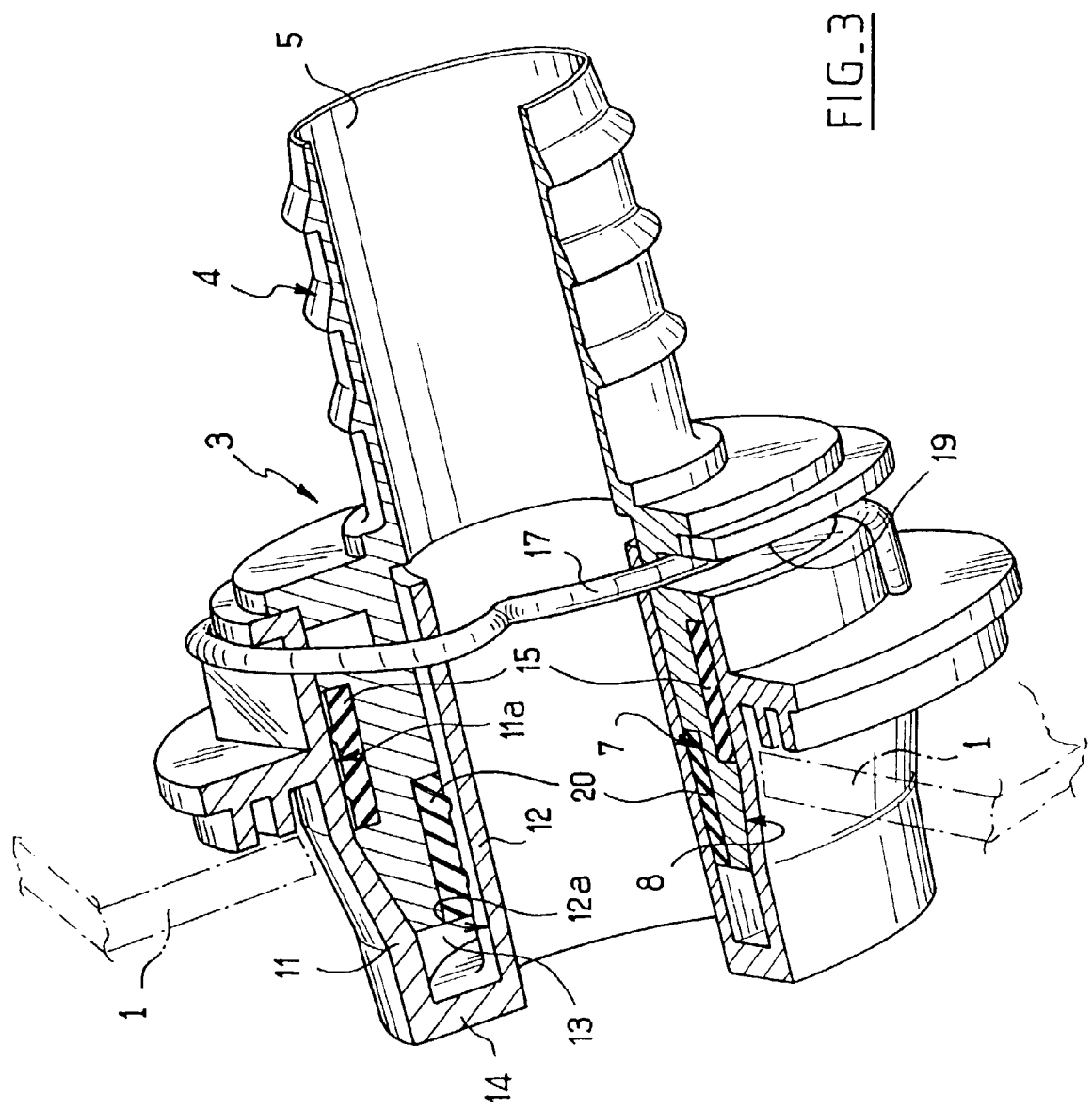
FIG. 3 is a partially cutaway perspective view of the device of the invention in the coupled-together state.

FIG. 1 shows the wall 1 of a functional member which can be, for example, a tank, a pump, . . . and which is to be connected to a tube 2. The tube 2 is extended by a rigid endpiece 3 with which it is firmly associated by any conventional device such as forced engagement on a serrated spigot 4 as shown.

The endpiece 3, which naturally has an axial inside passage 5, is terminated remote from the spigot 4 by an annular wall 6 defined by an inside surface 7 and an outside surface 8. The surfaces 7 and 8 are shown here as being coaxial about the central passage 5 of the endpiece, however the endpiece could constitute a bend with its surfaces extending differently relative to the passage.

The wall 1 of the functional member also has an endpiece 10, which endpiece has two coaxial walls 11 and 12 defining between them a blind housing 13 for receiving the portion 6 of the endpiece 3, this housing thus being closed by an end wall 14. The inner wall 12 of the endpiece 10 possesses an outside face 12a; the outer wall 11 of the endpiece 10 has an inside face 11a. Between the outside face 8 of the endpiece 3 and the inside face 11a of the wall 11 of the endpiece 10, there is a sealing device 15 and one particular embodiment thereof is described in greater detail with reference to the following figures. The co-operation between the outside surface 12a of the inner wall 12 and the inside surface 7 of the portion 6 of the endpiece 3 is leaktight cooperation, with or without a gasket. When the coupling is not a coupling that provides instant connection merely by moving the two endpieces together, co-operation between the surfaces 12a and 7 can be implemented, for example, by means of a thread and tapping with a gasket being placed between the two pieces. For a quick coupling, this co-operation takes place via another gasket, and a particular embodiment thereof is shown in the figures below.

Like the endpiece 3, the endpiece 10 has an inside passage 16 for the fluid that circulates from the tube 2 towards the functional member, or in the opposite direction. The point of greatest permeability in the hydraulic circuit including this coupling is naturally the space that exists between the surfaces 12a and 7. It will be understood that with the invention, this space leads to the blind housing 13 which constitutes a chamber for confining and accumulating any substance that has managed to get past the sealing between the two surfaces 12a and 7. In this confinement space, the substance is at a pressure that is lower than its pressure inside the pipe conveying the substance, so the sealing system 15 is much more effective than the same system would be if it were to be placed directly between the surfaces 7 and 12a. The substance can thus stagnate in this housing 13, and if the wall 11, 12, and 14 of the housing 13 is permeable, it can flow through this wall. That is why it is advantageous to provide for the endpiece 10 to be located on the side of the wall 1 of the functional member that is on the inside of this member, which might be a tank or a pump, for example, so that any substance which leaves the blind housing 13 through its wall returns to the functional member instead of going to the atmosphere.

In FIGS. 2 and 3, the embodiment shown relates to a coupling device of the quick-coupling kind. The elements of this device that are already described above with reference to FIG. 1 have the same references.

The endpiece 10 which is shown here in the form of a piece that is separate from the functional member to which it is to be fitted, which separate piece can be fitted to said functional member by any conventional means such as bonding by ultrasound, by vibration, by rotation, or by adhesive . . . (the endpiece being fixed to a wall 1 of the member that is represented diagrammatically by chain-dotted lines in FIG. 3). The endpiece 10 thus has a portion which is situated on one side of the wall 1 that essentially constitutes the blind housing 13 which is located inside the functional member, while it has another portion remote from the housing 13 that projects outside the wall 1 and carries a resilient clip 17 in conventional manner with its prongs penetrating into slots 18 of the endpiece 10 so as to constitute resilient latches for engaging the endpiece 3 when it is engaged in the endpiece 10. The branches of the clip 17 are initially spaced apart by the conical portion of the surface 8 of the endpiece 3 as it passes over them in the slots 18, and then beyond the gasket 15 these branches spring resiliently into a groove 19 provided in the endpiece 3.

In FIGS. 2 and 3 it can be seen that the sealing device 15 is constituted by an elastomer material received in an outside groove in the surface 8 of the endpiece 3. Similarly, there is a sealing device 20 formed of elastomer material received in an inside groove in the inside surface 7 of said endpiece 3. Preferably, the endpiece 3 is made by two-material injection so that the gaskets 15 and 20 are formed integrally with the endpiece 3.

The invention claimed is:

1. A low permeability coupling device in an engine for coupling a tube (2) extended by a first endpiece (3) with a second endpiece (10) carried by the wall (1) of a member to be connected to the tube, the second endpiece (10) having two substantially coaxial walls (11, 12) defining between them a blind annular housing (13) for receiving the first endpiece (3), wherein an elastomeric sealing element (15) extends between the inside face (11a) of the outer wall (11) of the second endpiece and the outside surface (8) of the first endpiece, while the inside surface (7) of the first endpiece has an elastomeric sealing element (20) in contact with the outside face (12a) of the inner wall (12) of the second endpiece when said first endpiece is placed in the above-mentioned housing (13), and further wherein said blind annular housing (13) confines hydrocarbon emissions.

2. A device according to claim 1, wherein the first endpiece (3) co-operates with the housing (13) of the second endpiece (10) to define an empty space for confining emissions of substances that occur between the inner wall of the second endpiece and the first endpiece.

3. A device according to claim 1, wherein the blind end of the annular housing (13) is located inside the member, the wall of which carries the second endpiece (10).

4. A device according to claim 1, including means (17, 18, 19) for releasably securing the connection between the first and second endpieces.

5. A device according to claim 1, wherein the second endpiece (10) is an element fitted to the wall (1) of the member by any connection means.

6. A device according to claim 1, wherein said sealing elements (15, 20) include at least one elastomeric sealing gasket (20) facing towards the inner wall (12) of the second endpiece and at least one elastomeric sealing gasket (15) facing towards the outer wall (11) of the second endpiece, the first endpiece (3) and the gaskets (15, 20) being formed as a single piece obtained by a two-material injection method.

* * * * *